United States Patent [19]
Schmidt et al.

[11] Patent Number: 5,619,975
[45] Date of Patent: Apr. 15, 1997

[54] METHOD FOR MONITORING OPERATIONS OF AN INTERNAL COMBUSTION ENGINE TO DETECT COMBUSTION MISSES

[75] Inventors: Peter-Jürgen Schmidt, Schwieberdingen; Manfred Mezger, Markgroeningen; Walter Gollin, Sachsenheim; Arnd-Matthias Langner, Kornwestheim; Klaus Ries-Mueller, Bad Rappenau, all of Germany

[73] Assignee: Robert Bosch GmbH, Stuttgart, Germany

[21] Appl. No.: 666,361
[22] PCT Filed: Oct. 13, 1995
[86] PCT No.: PCT/DE95/01406
§ 371 Date: Jun. 20, 1996
§ 102(e) Date: Jun. 20, 1996
[87] PCT Pub. No.: WO96/12887
PCT Pub. Date: May 2, 1996

[30] Foreign Application Priority Data

Oct. 20, 1994 [DE] Germany .................... 44 37 480.1

[51] Int. Cl.⁶ .................................................. F02P 3/12
[52] U.S. Cl. .................................................. 123/644
[58] Field of Search .......................... 123/644, 599, 123/638, 643, 640

[56] References Cited

U.S. PATENT DOCUMENTS

| | | | |
|---|---|---|---|
| 4,177,783 | 12/1979 | Palomeque | 123/638 |
| 4,198,942 | 4/1980 | Kuroda et al. | 123/638 |
| 4,548,174 | 10/1985 | Anderson | 123/310 |
| 4,691,288 | 9/1987 | Kay et al. | 364/511 |
| 4,918,389 | 4/1990 | Schleupen et al. | 324/399 |
| 5,107,817 | 4/1992 | Dittmann et al. | 123/643 |
| 5,146,905 | 9/1992 | Davis | 123/599 |
| 5,201,293 | 4/1993 | Langner et al. | 123/436 |
| 5,299,543 | 4/1994 | Taruya et al. | 123/644 |
| 5,309,888 | 5/1994 | Deutsch et al. | 123/644 |
| 5,327,090 | 7/1994 | Shimasaki et al. | 123/644 |
| 5,370,099 | 12/1994 | Koelle et al. | 123/644 |
| 5,445,122 | 8/1995 | Gerhard et al. | 123/638 |

FOREIGN PATENT DOCUMENTS 0344349 12/1989 European Pat. Off. .
4035957 5/1992 Germany .

Primary Examiner—Raymond A. Nelli
Attorney, Agent, or Firm—Kenyon & Kenyon

[57] ABSTRACT

A method is proposed for monitoring operations of an internal combustion engine to detect combustion misses for internal combustion engines having dual spark coils. A method is provided for the primary-side monitoring of the spark voltage and/or of the spark duration, and a method is provided for detecting irregular operations. If a faulty ignition is detected in one cylinder at one spark plug by monitoring the spark voltage and/or the spark duration, the second spark plug in this cylinder is then cut off (de-energized) and the reaction to this cut-off is monitored by means of the method for detecting irregular running. If the irregular running detection confirms faulty operation of the internal combustion engine, then the faulty ignition at the first spark plug of a cylinder was correctly recognized and appropriate emergency measures are introduced.

3 Claims, 2 Drawing Sheets

METHOD FOR MONITORING OPERATIONS OF AN INTERNAL COMBUSTION ENGINE TO DETECT COMBUSTION MISSES

FIELD OF THE INVENTION

The present invention is based on a method for monitoring operations of an internal combustion engine to detect combustion misses.

BACKGROUND INFORMATION

A method is described in German Patent Publication No. 40 35 957, or in the corresponding U.S. Pat. No. 5,201,293, in which a primary-side monitoring of the spark voltage and/or of the spark duration, as a method for detecting ignition misfirings, is so combined with a method for measuring irregular running, as a recognition of combustion misses, that at least one of the two methods will work under every engine operation condition, and that under those engine operation conditions, in which one of the two methods yields inaccurate results, the method yielding inaccurate results is masked out (suppressed), the consequence being that only the other method is performed each time. In those cases, in which both methods are performed, the results of the various methods can be examined in a plausibility check to reduce the risk of faulty monitoring results.

Individual methods for monitoring operations of the internal combustion engine are also described in European Patent Application No. 0 344 349, for example, which shows a primary-side monitoring of the spark duration. A method for detecting irregular operation of the internal combustion engine is described in U.S. Pat. No. 4,691,288.

SUMMARY OF THE INVENTION

In contrast, the method according to the present invention is advantageous in that, when working with internal combustion engines having two spark plugs per cylinder, a recognition of ignition misfiring at the first spark plug in one cylinder is monitored by applying the irregular-running method after the second spark plug in this cylinder has been de-energized.

Accordingly, it is possible to diagnose a twin-spark ignition by selectively de-energizing the spark plugs. Therefore, the present invention provides a reliable method for detecting combustion misses, in particular at high speeds and loads.

Another embodiment of the present invention allows, for example, after a malfunction is detected at one spark plug, to shut off the injection into a specific cylinder in order to prevent unburned (combustible) mixture from getting in the exhaust.

DETAILED DESCRIPTION

Figure 1:
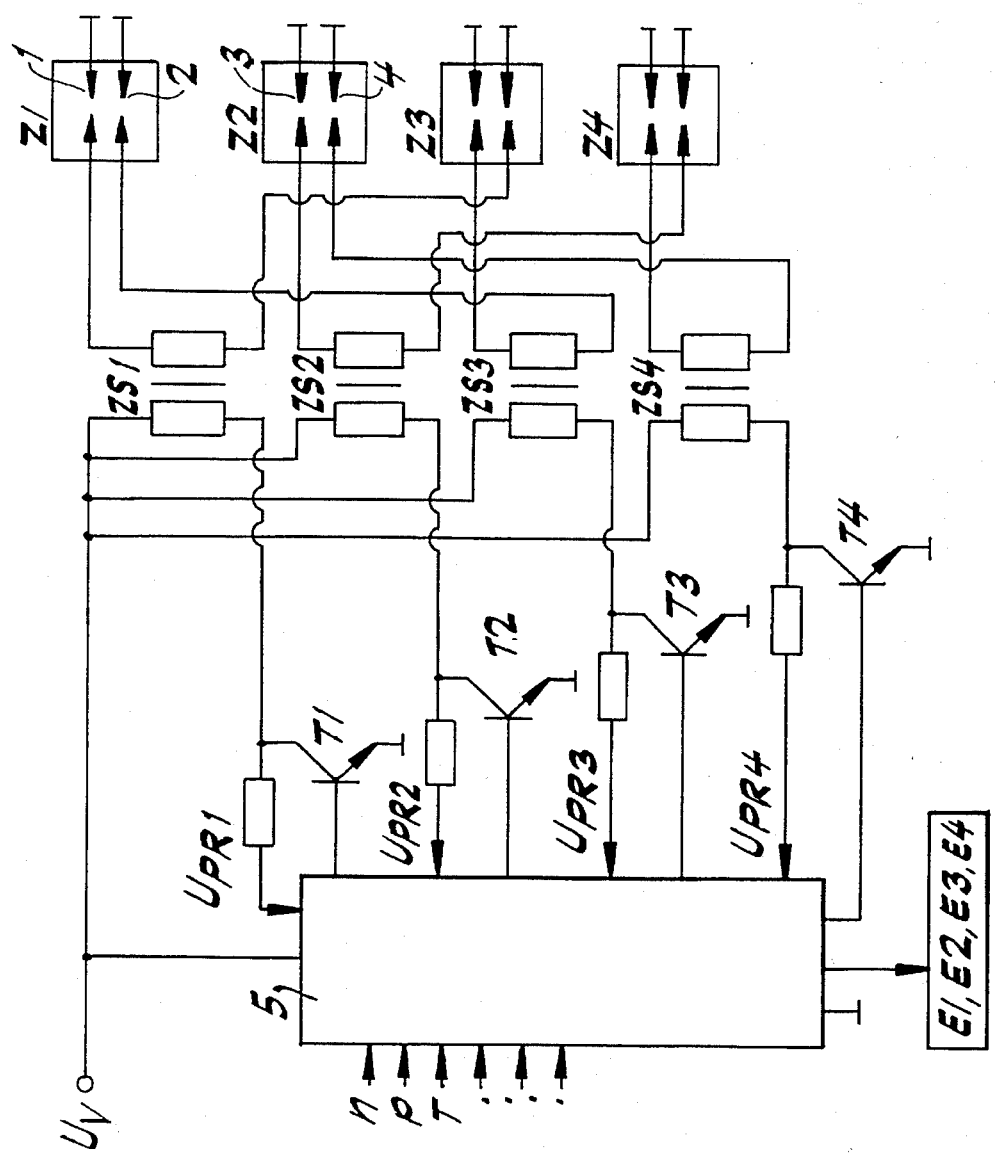
FIG. 1 shows a diagram of an internal combustion engine having dual spark coils for implementing the method according to the present invention.

FIG. 1 shows an exemplary design of an internal combustion engine including dual spark coils and the sensing (recording) of quantities required for monitoring operations of the internal combustion engine according to the present invention. An exemplary four-cylinder internal combustion engine is illustrated in FIG. 1. It is possible to have other internal combustion engines with more cylinders, as well. In the internal combustion engine as shown in FIG. 1, four ignition coils ZS1, ZS2, ZS3, ZS4 are provided, each consisting of a primary winding and of a secondary winding. The primary winding of each ignition coil is connected, for example, to the supply voltage $U_V$, e.g. to the battery of the internal combustion engine. The other side of the primary winding is connected respectively to ground via transistor output stages T1, T2, T3, T4 for driving the current flow in the primary windings of ignition coils ZS1, ZS2, ZS3, ZS4. Each end of the secondary winding of each ignition coil is connected to a spark plug. In this embodiment of the present invention, the spark plugs which are fed by an ignition coil, are installed in various cylinders so that these cylinders are offset (staggered) from one another by a 360° arc of crankshaft rotation in the compression stroke. Thus, in the basic design according to the present invention as shown in FIG. 1, the spark plugs 1 and 2 of the cylinder Z1 are fed, on the one hand, by the ignition coil ZS1 and, on the other hand, by the ignition coil ZS3. Also, the spark plugs 3 and 4 of the cylinder Z2 are fed by the ignition coils ZS2 and ZS4. The output stages T1 through T4, which switch on and off the current flow in the primary windings of the ignition coils, are driven by a control unit 5. Accordingly, the signals of the sensors (not shown) for detecting the operating parameters such as speed n, pressure p, temperature T, and the like are conducted (transmitted) to the control unit 5. On the basis of the detected operating parameters, the control unit 5 determines the point of ignition and the dwell period for the individual ignition coils. A voltage tap is placed in each series connection which includes a primary winding and a transistor output stage, so that a signal corresponding to the spark voltage transmitted to the primary side is conducted for each ignition coil to the control unit 5. The spark voltage transformed to the primary side is evaluated in the control unit 5. According to the present invention, the spark duration can be detected and compared to specified values. Another embodiment of the present invention allows a spark voltage characteristic to be compared with a stored spark voltage characteristic so that an error is generated if there is a discrepancy. The control unit 5 continues to drive the injectors E1, E2, E3, E4, so that the process of injecting the individual cylinders is controllable by the control unit 5 for each individual cylinder.

Figure 2:
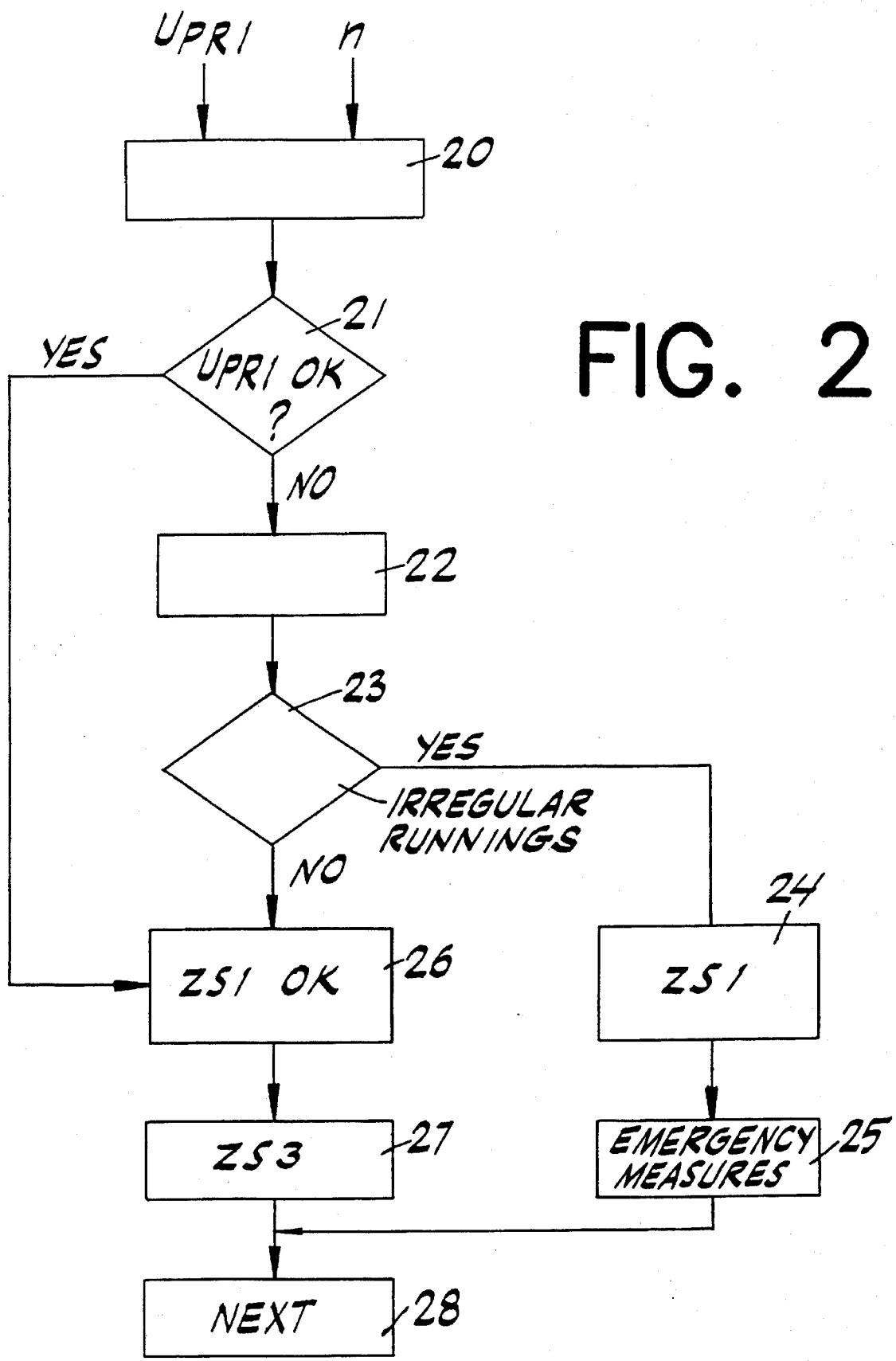
FIG. 2 shows a sequence of process steps for monitoring operations of the internal combustion engine according to the present invention.

FIG. 2 shows individual process steps for implementing the method in accordance with the present invention. The individual process steps are illustrated in FIG. 2 on the basis of the exemplary design according to the present invention as shown in FIG. 1.

Work step 20 provides for a detection of the quantities for implementing the monitoring operations of the internal combustion engine in the control unit 5. Thus, the spark voltage $U_{PR}$ provided on the primary side of the ignition coils is detected for a specific cylinder in which an ignition has just occurred and has been compared with determinable values. At the same time, the speed of the internal combustion engine is measured by an rpm sensor. Thus, the primary voltage $U_{PR1}$ which represents the spark voltage characteristic at the spark plug 1, is detected for ignition in cylinder Z1. As already explained, this detected primary voltage characteristic is evaluated in a subsequent query 21. If a faulty spark voltage is determined, then the "N" output of query 21 leads to work step 22, in which the ignition coil ZS3, which supplies the spark plug 2 (connected in parallel to the spark plug 1) with high voltage in cylinder Z1, is switched off. In work step 22, such switch-off operation performed by the ignition coil ZS3. By switching off a high secondary voltage supplied to the spark plug 2, subsequent check is performed in query 23 whether an irregular operation of the internal combustion engine is determined after a completed ignition in the cylinder Z1. If an irregular operation was determined in the query 23, then the ignition in the cylinder ZS1 is recognized as faulty in work step 24, which is connected to the "Y" output of query 23. Emergency measures are then triggered in work step 25, such as switching off the injection in cylinder $Z_1$. If the query 23 was answered in the negative (i.e., directed to "N" output of query 23), it is then established in work step 26 that the ignition in cylinder Z1 was acceptable, which, in turn, means that the spark plug 1 has produced a suitable spark. Thus, the faulty spark voltage at the spark plug 1 originally determined in query 21 has not been confirmed by the irregular running method, and the supplying of the ignition coil ZS3 can be switched on again in work step 27. The process subsequently starts again in work step 28 by returning to the beginning of the process.

What is claimed is:

1. A method for monitoring operation of an internal combustion engine to detect combustion misses, the internal combustion engine including at least one ignition coil, at least one cylinder and at least two spark plugs, first and second of the at least two spark plugs being associated with one of the at least one cylinder, the method comprising the steps of:

monitoring at least one of a spark voltage and a spark duration to detect an ignition misfire in the internal combustion engine;

supplying a high secondary voltage using the at least one ignition coil;

switching off a first ignition coil of the at least one ignition coil when the ignition misfire is detected at the first spark plug of the one of the at least one cylinder during an ignition cycle, the at least one ignition coil supplying the high secondary voltage to the second spark plug of the one of the at least one cylinder;

activating an irregular operation monitoring of the internal combustion engine; and detecting the ignition misfire of the first spark plug when irregular operation of the internal combustion engine is detected.

2. The method according to claim 1, further comprising the step of recognizing a correct operation of the first spark plug when the irregular operation of the internal combustion engine is not detected.

3. The method according to claim 1, further comprising the step of switching off an ignition to the one of the at least one cylinder when the ignition misfire of the first spark plug is detected, the ignition being switched off by shutting off a fuel injection to the one of the at least one cylinder and by de-energizing the at least one ignition coil.

* * * * *